M. C. OVERMAN.
FASTENING MEANS FOR TIRES.
APPLICATION FILED DEC. 26, 1916.

1,283,881. Patented Nov. 5, 1918.

2 SHEETS—SHEET 1.

INVENTOR.
Max Cyrus Overman
BY
Foscher ATTORNEY.

M. C. OVERMAN.
FASTENING MEANS FOR TIRES.
APPLICATION FILED DEC. 26, 1916.
1,283,881.
Patented Nov. 5, 1918.
2 SHEETS—SHEET 2.
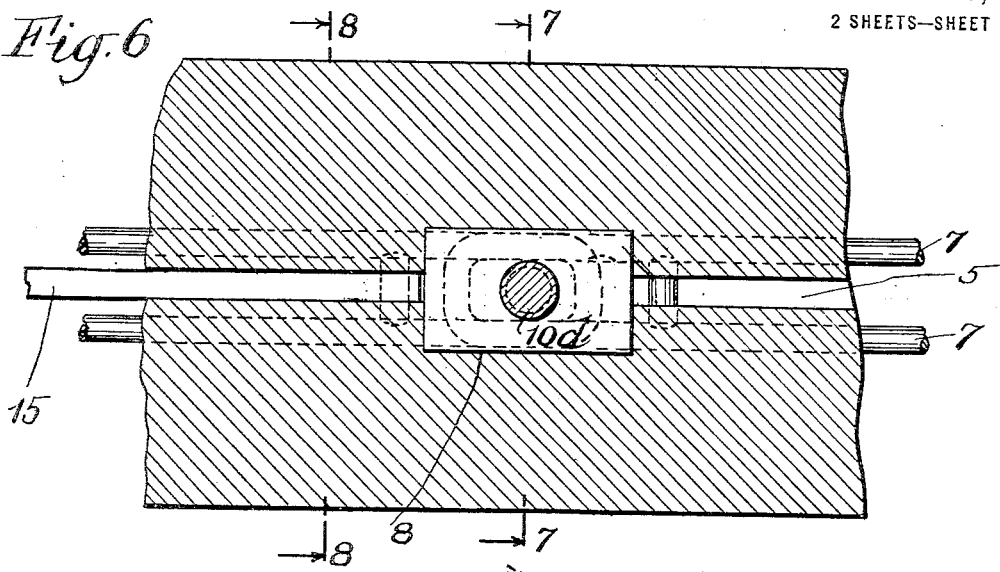
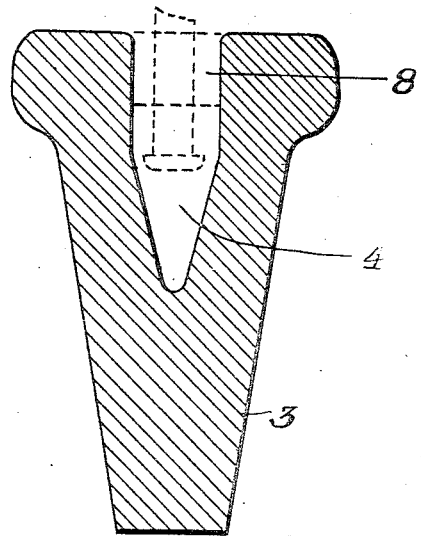
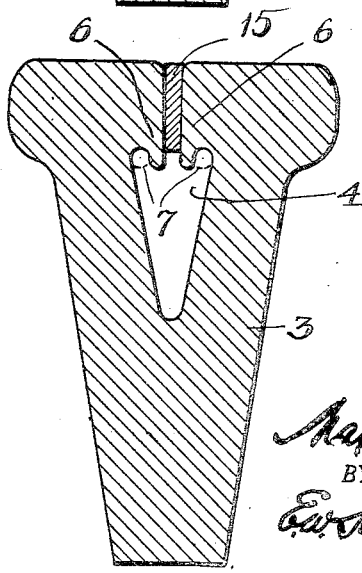
INVENTOR.
Max Cyrus Overman
BY
ATTORNEY.

UNITED STATES PATENT OFFICE.

MAX CYRUS OVERMAN, OF NEW YORK, N. Y.

FASTENING MEANS FOR TIRES.

1,283,881.   Specification of Letters Patent.   Patented Nov. 5, 1918.

Application filed December 26, 1916. Serial No. 138,834.

*To all whom it may concern:*

Be it known that I, MAX CYRUS OVERMAN, a citizen of the United States, residing at New York city, in the county and State of New York, have invented certain new and useful Improvements in Fastening Means for Tires, of which the following is a specification.

My present invention relates to fastening-means for tires and is intended to be used with any form of tire to which it is applicable. The drawings show a narrow high cushion-tire not intended in practice to be used alone or by itself on a single wheel. However said form of tire will serve to illustrate the general nature and mode of operation of my fastening-means.

Figure 1:
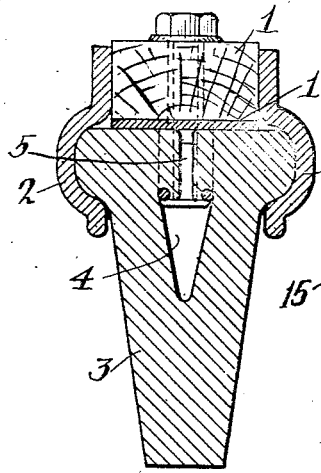
Figure 2:
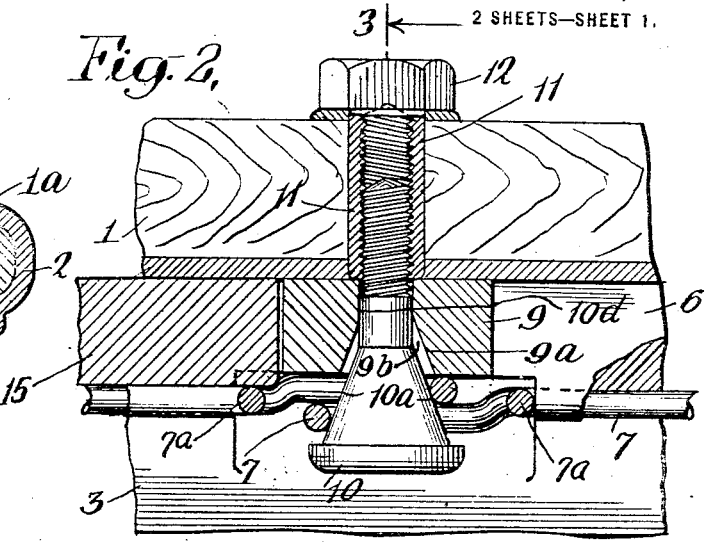
Figure 4:
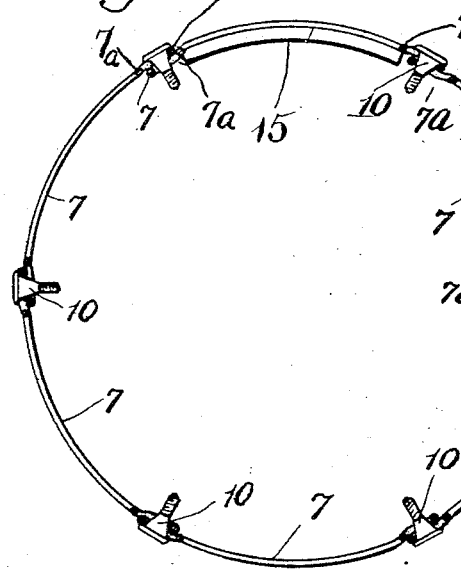
Figure 3:
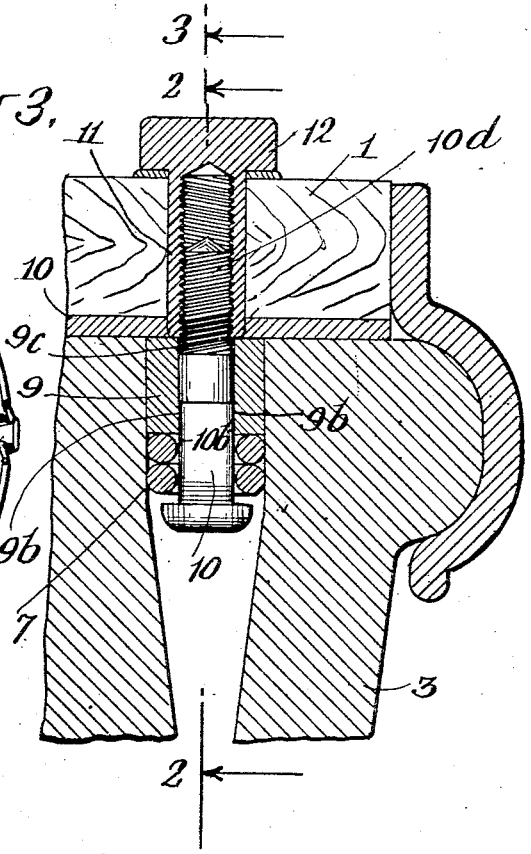
Figure 5:
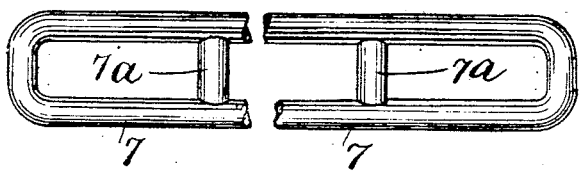

In the drawings, Figure 1 is a cross-section through a wheel-felly and tire equipped with one of the embodiments my fastening-means is adapted to take; Fig. 2 is an enlarged longitudinal section of the same on the line 2—2 in Fig. 3 looking in the direction of the arrows; Fig. 3 is a cross-section on the line 3—3 in Fig. 2 looking in the direction of the arrows; Fig. 4 is a diagrammatical side-view showing the wires and wedges in their working relationship; Fig. 5 is a partial plan view of one of said wires; Fig. 6 is a view of the back of a portion of the tire indicating by the dotted lines parts of the fastening-means; and Figs. 7 and 8 are cross-sectional views on the lines 7—7 and 8—8 respectively in Fig. 6.

Describing now the specific devices of the drawings:—1 is the felly of a wheel which may be of wood, as shown, surrounded by a felly-band $1^a$. 2—2 are the usual flanges secured to the sides of the felly. 3 is a cushion-tire made of a suitable rubber compound, wherein 4 is the opening extending longitudinally around and through the tire. The back of the tire or portion next the felly has a central longitudinal slot 5 (Figs. 1, 6 and 8) leading into the wider top of the foresaid longitudinal tire-opening 4. This provides the inwardly-directed basal portions 6—6 (Fig. 8) of the tire which overhang the tire-opening 4 and are the parts, in the form of tire illustrated, that are clamped against the felly or felly band, if there be one, by the wires 7 of my fastening means.

Each wire 7 takes the form of an elongated loop or link. The side-bars of each link bear up against the under-sides of the basal-portions 6—6 of the tire which latter may be provided with longitudinal grooves as shown to receive them (Fig. 8).

The wire-links 7 are such that when in position, the end or eye of one link overlaps the eye of the adjacent link, and so on around the tire as shown in Figs. 4, 6 and elsewhere in the drawings. Wherever these overlappings occur there is provided a rectangular or box-shaped recess 8 in the back-portion of the tire, the same being well shown for instance in Figs. 6 and 7.

9 is a block preferably of metal, located one in each of said recesses 8. I hereinafter call these blocks "anvils" merely as a convenient term to designate said blocks whether in the same or some equivalent form.

Each anvil-block 9 in the specific form illustrated has a vertical opening through it which in longitudinal section has the form shown in Fig. 2 and in mid-transverse section has the form shown in Fig. 3. In other words there is a cavity or recess in the block whose end-walls $9^a$ converge upwardly toward each other but whose side-walls $9^b$ do not. A round hole $9^c$ through the top of each block connects with the aforesaid cavity therein.

10—10 are wedges, one for each anvil-block 9 and each having the general shape of the recess in said blocks. In other words, the ends $10^a$ (Fig. 2) of each wedge converge upwardly toward each other, whereas its sides $10^b$ (Fig. 3) are preferably parallel. Further each wedge converges to a screw-threaded cylindrical stem $10^d$.

An inspection of Figs. 2, 3 and 4 will show how said stems of these wedges 10 are passed each through one pair of the overlapping eyes of the wire-links 7, thence through the given anvil-block 9 into threaded engagement with an internally threaded cylindrical sleeve 11 on a nut 12, said sleeve being located in a hole provided for it in the felly and there being as many of these suitably located holes and sleeved nuts as there are wedges 10. By taking up on said nuts 12 with a wrench, it will be seen from Figs. 2 and 4 that the wedges 10 will be drawn toward the felly and the converging portions of said wedges will draw the wire-loops of each pair powerfully toward each other, so as to shorten the total circumferential length of said wires and thereby pull their side-bars everywhere against the basal-portions 6—6 of the tire and thereby bind the tire with great security to the felly. In accomplishing the above it will be seen that the anvil-blocks 9 act as stops preventing the eyes of the loops 7 from being pulled toward the felly and thereby compelling them to slide endwise on each other under the action of the wedges 10 when operated from the nuts 12. In turning the sleeved nuts 12, the tendency of the wedges 10 to twist is prevented by the parallel faces $10^b$ of the wedges coacting with the corresponding walls of the cavities in the anvil blocks 9.

The ends of the wire-links 7 where they overlap are bent to either side of the true circumferential line so that the wedge will act equally or more uniformly on both links of the given pair.

Fig. 4 shows only six wedges 10 and links 7 but the number used in actual practice will depend upon the size of the wheel and will be the minimum number that will bind the given tire with all necessary security to the wheel.

The links 7 have cross-pieces $7^a$ on which rest filling-strips 15 of wood or other suitable material located in the slot 4 of the tire to prevent the base-portions 6—6 from squeezing into this slot and thereby relaxing the grip of the links 7 on said portions.

My invention provides a very effective yet comparatively simple tire fastening means, the features and advantages of which will be readily appreciated by those skilled in the art.

What I claim is:—

1. In combination, a felly, a tire, a plurality of wire-members located circumferentially of the tire and slidable endwise relatively to each other to clamp the tire to the felly when the wires are shortened circumferentially, the end of one wire extending beyond the end of the next wire, said ends having lateral extensions, and wedge-means operable to and from the felly and acting between the lateral extensions of adjoining wires to make said wires slide circumferentially.

2. In combination, a felly, a tire, a plurality of wire-members located circumferentially of the tire and slidable endwise relatively to each other to clamp the tire to the felly when the wires are shortened circumferentially, and wedge-means operable to and from the felly and acting to make said wires slide circumferentially, each wire-member being an elongated link and the ends of adjacent links being overlapped with the wedge of the wedge-means acting therein.

3. In combination, a felly, a tire, a plurality of wire-members located circumferentially of the tire and slidable endwise relatively to each other to clamp the tire to the felly when the wires are shortened circumferentially, and wedge-means operable to and from the felly and acting to make said wires slide circumferentially, each wire-member being an elongated link and the ends of adjacent links being overlapped with the wedge of the wedge-means acting therein, said links having cross-pieces located between their side-bars.

4. In combination, a felly, a tire, a plurality of wire-members located circumferentially of the tire and slidable endwise relatively to each other to clamp the tire to the felly when the wires are shortened circumferentially and wedge-means operable to and from the felly and acting to make said wires slide circumferentially, each wire member having an eye at each end, the eyes of adjacent wire-members being overlapped with the wedge of the wedge-means acting therein.

5. In combination, a felly, a tire, a plurality of wire-members located circumferentially of the tire and slidable endwise relatively to each other to clamp the tire to the felly when the wires are shortened circumferentially and wedge-means operable to and from the felly and acting to make said wires slide circumferentially, each wire member having an eye at each end, the eyes of adjacent wire-members being overlapped with the wedge of the wedge-means acting therein, and anvil-blocks located between said eyes and the felly which stop the eyes from being drawn by the wedging means toward the felly.

6. In combination, a felly, a tire, a plurality of wire-members located circumferentially of the tire and slidable endwise relatively to each other to clamp the tire to the felly when the wires are shortened circumferentially, said tire having inwardly directed basal portions which are the portions of the tire that are clamped by said wires, filler strips adapted to fill the space between said basal portions, and wedge-means operable to and from the felly and acting to make said wires slide circumferentially.

In testimony whereof I have signed my name to this specification, this 23d day of December, 1916.

MAX CYRUS OVERMAN.